United States Patent [19]

Byrne et al.

[11] Patent Number: 5,443,810
[45] Date of Patent: Aug. 22, 1995

[54] PROCESS FOR MAKING BISMUTH-VANADIUM-MOLYBDENUM-CONTAINING COMPOSITIONS

[75] Inventors: Christine J. Byrne, Olmsted Township; Robert P. Blonski, North Royalton; John J. Welch, Cleveland, all of Ohio

[73] Assignee: Ferro Corporation, Cleveland, Ohio

[21] Appl. No.: 690,677

[22] Filed: Apr. 24, 1991

[51] Int. Cl.$^6$ ............ C01G 1/00; C01G 29/00; C01G 31/00; C01G 39/00
[52] U.S. Cl. ................................ 423/593; 106/479
[58] Field of Search ................ 423/593; 106/479

[56] References Cited

U.S. PATENT DOCUMENTS

| | | | |
|---|---|---|---|
| 3,773,535 | 11/1973 | Burgyanb et al. | 106/298 |
| 4,026,722 | 5/1977 | Hess | 106/288 B |
| 4,063,956 | 12/1977 | Higgins | 106/288 B |
| 4,115,141 | 9/1978 | Piltingsrud | 106/288 B |
| 4,115,142 | 9/1978 | Hess | 106/288 B |
| 4,230,500 | 10/1980 | Balducci et al. | 106/288 B |
| 4,251,283 | 2/1981 | Balducci et al. | 106/296 |
| 4,272,296 | 6/1981 | Balducci et al. | 106/288 B |
| 4,316,746 | 2/1982 | Rustioni et al. | 106/288 B |
| 4,455,174 | 6/1984 | Wienand et al. | 156/288 B |
| 4,752,460 | 6/1988 | Herren | 423/593 |
| 4,851,049 | 7/1989 | Wienand et al. | 106/479 |

FOREIGN PATENT DOCUMENTS

| | | |
|---|---|---|
| 0074049 | 8/1982 | European Pat. Off. |
| 0271813 | 9/1987 | European Pat. Off. |
| 3221338 | 6/1982 | Germany |
| 3315850 | 4/1983 | Germany |
| 3315851 | 4/1983 | Germany |
| 3643247 | 12/1986 | Germany |

OTHER PUBLICATIONS

Article from the Bulletin of the Bismuth Institute, entitled "Bismuth Vanadate–Molybdate: A New Yellow Pigment" (1988).
Armstrong et al., "Bismuth Titanate Solid Solutions", Mat. Res. Bull. vol. 7, pp. 1025–1034 (1972).
Hutchison, Anderson, and Rao, Electron Microscopy of Ferroelectric Bismuth Oxides Containing Perovskite Layers, (United Kingdom 1977).
Shebanov et al., New Bismuth-Bearing Compounds $Bi_2AB_2O_9$, May 14, 1984.
Osipyan et al., (Layered Bismuth Vanadate Ferroelectrics), May 5, 1985.
Subbanna et al., Superstructures Exhibited by Oxides of the Aurivillius Family, $(Bi_2O_2)^{2+}(A_{n-1}B_nO_{3n+1})^{2-}$, (United Kingdom, Jul. 7, 1986).
Translated Abstract of German Patent Disclosure No. 3135281. Bismuth Institute Reprint, A Bismuth-Containing Pigment: Molybdenum-Tungsten Yellow (Date Unknown).

Primary Examiner—Steven Bos
Attorney, Agent, or Firm—Rankin, Hill, Lewis & Clark

[57] ABSTRACT

This invention relates to a process for making a bismuth-vanadium-molybdenum-containing composition comprising: (A) preparing three separate aqueous compositions comprising: a first aqueous composition having a pH in the range of about 0.5 to about 4; a second aqueous composition comprising bismuth and having a pH in the range of about 0.2 to about 3; and a third aqueous composition comprising at least one salt of vanadium and at least one salt of molybdenum and having a pH in the range of about 9 to about 14; (B) adding said second aqueous composition and said third aqueous composition simultaneously to said first aqueous composition to form a fourth aqueous composition, and maintaining said fourth aqueous composition at a temperature in the range of about 30°C. to about 90°C. for up to about 4 hours, said fourth aqueous composition comprising precipitated solids; (C) separating said solids from said fourth aqueous composition; and (D) heating said solids at a temperature in the range of about 250°C. to about 675°C. for about 0.5 to about 30 hours to provide said bismuth-vanadtum-molybdenum-containing composition. This invention also relates to bismuth-vanadium-molybdenum-containing compositions made by the foregoing process, and to colored compositions containing such bismuth-vanadium-molybdenum-containing compositions.

35 Claims, 1 Drawing Sheet

PROCESS FOR MAKING BISMUTH-VANADIUM-MOLYBDENUM-CONTAINING COMPOSITIONS

TECHNICAL FIELD

This invention relates to a process for making bismuth-vanadium-molybdenum-containing compositions. More particularly, this invention relates to a precipitation process for making bismuth-vanadium-molybdenum-containing compositions which includes a critical co-precipitation step wherein an aqueous composition comprising bismuth and a separate aqueous composition comprising at least one salt of vanadium and at least one salt of molybdenum are simultaneously added to an acidic aqueous composition and precipitated solids are formed which comprise bismuth, vanadium and molybdenum. This invention also relates to bismuth-vanadium-molybdenum-containing compositions made by the foregoing process, these compositions being useful as colorants (e.g., yellow pigments). This invention also relates to colored compositions (e.g., organic compositions such as plastics, rubbers, and the like; inorganic compositions such as ceramics, porcelain enamels, and the like; coating compositions such as paint, printing ink, and the like; etc.) containing such bismuth-vanadium-containing compositions.

BACKGROUND OF THE INVENTION

Cadmium sulfide and lead chromate are among the most commonly used yellow pigments. Unfortunately, these pigments are toxic and thus there is a need for alternative yellow pigments. In the search for such alternative yellow pigments, interest has focused on the use of the bismuth-vanadate pigments. U.S. Pat. No. 4,026,722 discloses the use of bismuth-vanadate pigments represented by the formula $$BiVO_4.xAl_2O_3.ySiO_2$$

wherein x is about 0.25–2.0, y is about 0.1–3.5, and the sum of x and y is equal to or greater than 1. U.S. Pat. No. 4,063,956 discloses the use of monoclinic bismuth vanadate pigment containing a precoat of one or more porous hydrous oxides (e.g., aluminum, silicon, titanium, etc.) and a dense overcoat of amorphous silica.

U.S. Pat. Nos. 4,115,141 and 4,115,142 describe the use of monoclinic bismuth vansdate as a yellow pigment for coloring plastics and paints. These pigments are prepared by reacting bismuth nitrate with an alkali vanadate to obtain a bismuth-vanadate gel and then subjecting the gel to aqueous digestion or calcination to produce the bismuth-vanadate pigment.

U.S. Pat. No. 4,230,500 discloses greenish-yellow, yellow and orange-yellow pigments which consist substantially of bismuth vanadate of monoclinic structure, bismuth phosphate of monoclinic structure and aluminum phosphate of orthorhombic structure and which, in the case of yellow and orange-yellow pigments also comprise a compound derived from $Bi_2O_3$ and $V_2O_5$.

U.S. Pat. No. 4,251,283 discloses greenish-yellow pigments based on $BiVO_4$ made by the calcination, in the presence of air, of a mixture of $BiPO_4$, $V_2O_5$ and an oxide of Ca, Ba, Mg or Zn.

U.S. Pat. No. 4,272,296 discloses bismuth-vanadate based yellow pigments diluted with 10–90% by weight of orthorhombic $BaSO_4$.

U.S. Pat. No. 4,316,746 discloses molybdenum- or tungsten-containing, bismuth-vanadate yellow pigments represented by the formula $$Bi_{(1-x/3)}M_xV_{1-x}O_4$$

wherein M is Mo or W, x varies from 0.075 to 0.317 when M is Mo and from 0.059–0.265 when M is W. The reference indicates that these pigments may also contain a crystalline phase consisting of orthorhombic $BaSO_4$.

U.S. Pat. No. 4,455,174 discloses a bismuth-vanadate yellow pigment represented by the formula $$BiVO_4.xBi_2MoO_6.yBi_2WO_6$$

wherein x is 0.6–2.25 and y is 0–0.1. These pigments are prepared by a process in which a solution containing a bismuth (III) salt, a vanadate and a molybdate is acidified until the pH is less than zero. The pH of the acidic solution is then brought to 0.1–3.5 at 20°–95° C. by means of an alkaline solution which may or may not contain a dissolved tungsten (VI) compound. The precipitated product and the reaction solution are left at 50°–100° C. for 30–120 minutes, and then separated from one another. The product is washed, dried, if required, and heated at 300°–800° C. Example 2 discloses the preparation of a pigment represented by the formula $BiVO_4.0.2— Bi_2MoO_6$ which corresponds to $Bi_7V_5MoO_{26}$. German Offenlegungsschrift 3135281, which is the priority document upon which U.S. Pat. No. 4,455,174 is based, indicates that in the above formula, both x and y have values in the range of 0–3 and the sum of x and y is in the range of 0.1–3.

U.S. Pat. No. 4,752,460 discloses bismuth/vanadate/molybdate and bismuth/vanadate/tungstenate pigments represented by the formula $$(Bi,A)(V,D)O_4$$

wherein: A is an alkaline earth metal or zinc or mixture thereof; D is Mo, W or mixture thereof; the molar ratio of A:Bi is in the range of 0.1–0.4; and the molar ratio of D:V is in the range of 0–0.4. The notation (Bi,A) means that the bismuth is present in the form of the bismuth (III) ion and is partly replaced by the divalent metal cation A. Vanadium is present as the vanadium (V) ion in the form of the vanadate ion and can be partly replaced by the hexavalent metal cation D as molybdate or tungstenate or mixtures thereof. The reference indicates that these pigments are in the form of tetragonal, scheelitelike crystal structures, and can be coated with an inorganic protective coating such as a silicon compound and a texture-improving agent such as wax.

SUMMARY OF THE INVENTION

This invention relates to a process for making a bismuth-vanadium-molybdenum-containing composition comprising: (A) preparing three separate aqueous compositions comprising a first aqueous composition having a pH in the range of about 0.5 to about 4; a second aqueous composition comprising bismuth and having a pH in the range of about 0.2 to about 3; and a third aqueous composition comprising at least one salt of vanadium and at least one salt of molybdenum and having a pH in the range of about 9 to about 14; (B) adding said second aqueous composition and said third aqueous composition simultaneously to said first aqueous composition to form a fourth aqueous composition, and maintaining said fourth aqueous composition at a temperature in the range of about 30° C. to about 90° C. for up to about 4 hours, said fourth aqueous composition comprising precipitated solids; (C) separating said solids from said fourth aqueous composition; and (D) heating said solids at a temperature in the range of about 250° C. to about 675° C. for about 0.5 to about 30 hours to provide said bismuth-vanadium-molybdenum-containing composition. This invention also relates to bismuth-vanadium-molybdenum-containing compositions made by the foregoing process, and to colored compositions containing such bismuth-vanadium-molybdenum-containing compositions.

DESCRIPTION OF THE PREFERRED EMBODIMENTS

Figure 1:
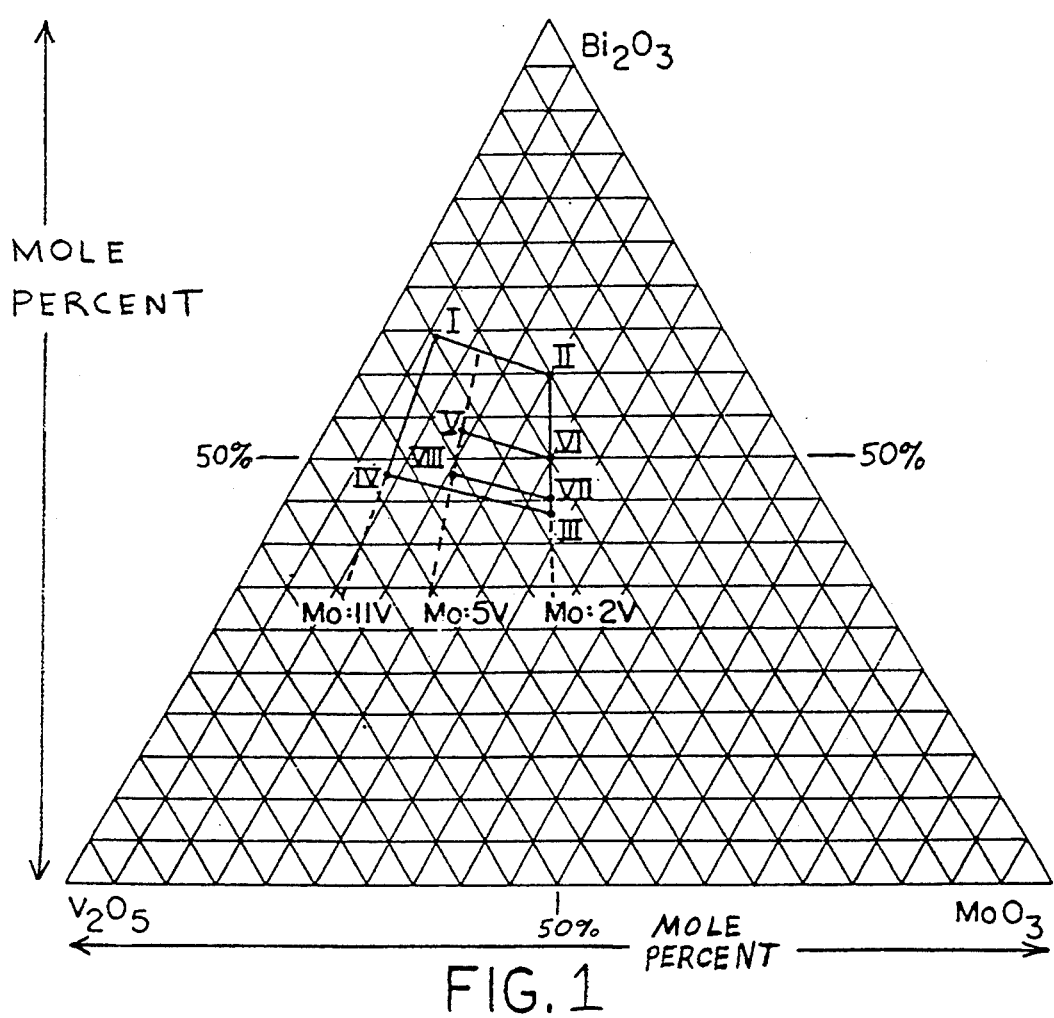
FIG. 1 is a ternary diagram expressed in molar quantities disclosing bismuth-vanadium-molybdenum-containing compositions made by the inventive process.

The inventive co-precipitation process comprises the steps of:

(A) preparing three separate aqueous compositions comprising: a first aqueous composition having a pH preferably in the range of about 0.5 to about 4, more preferably about 0.5 to about 1.5; a second aqueous composition comprising bismuth and having a pH preferably in the range of about 0.2 to about 3, more preferably about 0.2 to about 2; and a third aqueous composition comprising at least one salt of vanadium and at least one salt of molybdenum, said third aqueous composition preferably having a pH in the range of about 9 to about 14, more preferably about 10 to about 14;

(B) adding said second aqueous composition and said third aqueous composition simultaneously to said first aqueous composition to form a fourth aqueous composition, and maintaining said fourth aqueous composition at a temperature preferably in the range of about 30° C. to about 90° C., more preferably about 50° C. to about 80° C., for preferably up to about 4 hours, more preferably up to about 2 hours, more preferably about 0.1 to about 2 hours, said fourth aqueous composition comprising precipitated solids;

(C) separating said solids from said fourth aqueous composition; and (D) heating said solids at a temperature in the range of about 250° C. to about 675° C. for about 0.5 to about 30 hours to provide said bismuthvanadium-molybdenum-containing composition.

The first aqueous composition preferably has a temperature in the range of about 30° C. to about 90° C., more preferably about 50° C. to about 80° C. Any inorganic acid can be used to provide the required pH for the first aqueous composition. In one embodiment, the acid is nitric acid. Examples of other acids include hydrochloric acid and sulfuric acid.

The bismuth that is used to form the second aqueous composition can be bismuth metal or it can be a salt, preferably a nitrate, sulfate, oxalate or carbonate. Examples of such bismuth salts include $Bi(NO_3)_3 \cdot 5H_2O$, $Bi(OH)_3$, $BiCl_3$, $Bi_2O_2SO_4H_2O$, and $Bi_2O_2CO_3$. The concentration of the bismuth in the second aqueous composition is preferably in the range of about 50 to about 800 grams per liter, more preferably about 50 to about 400 grams per liter. Any inorganic acid can be used to provide the desired pH for the second aqueous composition, with nitric acid being preferred. Examples of other acids include hydrochloric acid and sulfuric acid. The temperature of said second aqueous composition is preferably in the range of about 30° C. to about 50° C., more preferably about 30° C. to about 40° C.

The salts of vanadium and molybdenum that are used in the third aqueous composition are preferably alkali metal (e.g., Na, K) or ammonium salts. Examples include $NH_4VO_3$, $Na_3VO_4$, $NaVO_3$, $Na_2MoO_4 \cdot 2H_2O$, $(NH_4)_6Mo_7O_{24} \cdot 4H_2O$, and $(NH_4)_2MoO_4$. Any base, such as NaOH, can be used to provide the desired pH. Examples of other bases include potassium hydroxide and ammonium hydroxide. The concentration of the vanadium in the third aqueous composition is preferably about 5 to about 200 grams per liter, more preferably about 12 to about 80 grams per liter. The concentration of the molybdenum in said third aqueous composition is preferably from about 1 to about 100 grams per liter, more preferably about 5 to about 60 grams per liter. In one embodiment of the invention the molar ratio of vanadium to molybdenum in said third aqueous composition is in the range of preferably about 11:1 to about 2:1, more preferably about 7:1 to about 3:1, more preferably about 5:1. The temperature of the third aqueous composition is preferably in the range of about 30° C. to about 70° C., more preferably about 30° C. to about 50° C.

During step (B) the second and third aqueous compositions are added to the first aqueous composition to provide for the formation of the fourth aqueous composition. The fourth aqueous composition is an aqueous solution that contains precipitated solids. This co-precipitation step is critical to this invention. The addition is preferably conducted at steady flow rates of each of said second and third aqueous compositions over a period of about 30 minutes to about 3 hours, more preferably about 1 to about 2 hours. The first aqueous composition is preferably subjected to agitation during such addition. The flow rate of the second aqueous composition can be in the range of about 2 to about 10 cc/minute, more preferably about 4 to about 8 cc/minute. The flow rate of the third aqueous composition can be in the range of about 1 to about 9 cc/minute, more preferably about 2 to about 7 cc/minute. The temperature of the fourth aqueous composition is preferably in the range of about 30° C. to about 90° C., more preferably about 50° C. to about 80° C. The pH of the fourth aqueous composition is preferably in the range of about 0.5 to about 6, more preferably about 0.5 to about 3, more preferably about 0.8 to about 1.5.

An effective amount of a base can be added to the fourth aqueous composition during step (B) to increase the concentration of bismuth in the precipitate. Examples of such bases include sodium hydroxide, ammonium hydroxide and potassium hydroxide. Typically, sufficient base is added to raise the pH of the fourth aqueous composition to a level in the range of about 1 to about 6, more preferably about 1 to about 3. Preferably, the base is added over a period of about 0.5 to about 2 hours, more preferably about 0.5 to about 1 hour.

After the additions during step (B) are completed and any additional base is added, the fourth aqueous composition is maintained at a temperature preferably in the range of about 30° C. to about 90° C. more preferably about 50° C. to about 80° C. for preferably up to about 4 hours, more preferably up to about 2 hours, more preferably about 0.1 to about 2 hours. The precipitated solids are then separated from the fourth aqueous composition using conventional techniques (e.g., filtration), and preferably washed and dried.

The solids are then heated or calcined at a temperature in the range of about 250° C. to about 675° C. for about 0.5 to about 30 hours, more preferably about 1 to about 20 hours, to provide the desired bismuth-vanadium-molybdenum-containing solids composition. In one embodiment of the invention, this heating step is conducted at a sufficient temperature and for an effective period of time to provide a single-phase crystalline structure. The heating or calcination step (D) can be conducted using a single step or a multi-step heating cycle. In one embodiment of the invention, the temperature of the solids is increased to a peak temperature of about 525° C. to about 675° C., more preferably about 575° C. to about 625° C., more preferably about 600° C., over a period of preferably about 1 minute to about 4 hours, maintained at said peak temperature for preferably about 1 to about 10 hours, more preferably about 2 to about 6 hours, more preferably about 4 hours; and cooled to ambient temperature. In another embodiment, the temperature of the solids is increased to an intermediate temperature in the range of about 250° C. to about 450° C. over a period of preferably about 1 minute to about 4 hours, more preferably about 1 minute to about 2 hours; maintained at said intermediate temperature for preferably about 1 to about 10 hours, more preferably about 1 to about 4 hours, more preferably about 2 hours; increased to a peak temperature in the range of preferably about 525° C. to about 675° C., more preferably about 575° C. to about 625° C., more preferably about 600° C., over a period of preferably about 1 minute to about 4 hours, more preferably about 30 minutes to about 3 hours; maintained at said peak temperature for about 1 to about 10 hours, more preferably about 1 to about 4 hours, more preferably about 2 hours; and cooled to ambient temperature. In each of the foregoing embodiments the solids are cooled from the peak temperature to ambient temperature over a period of preferably about 6 to about 16 hours, more preferably about 10 hours.

The solids are reduced to a desired particle size, preferably in the range of about 0.1 to about 2 μm, more preferably about 0.2 to about 0.81 μm, using techniques known in the art (e.g., crushing, grinding, etc.).

In one embodiment of the invention, it is preferred to make a single-phase product. In said embodiment, if the product solids contain more than a single crystalline phase, which can be detected using x-ray diffraction, it is preferred that the solids be heated again to a temperature in the range of about 525° C. to about 675° C., more preferably about 575° C. to about 625° C., for preferably about 1 to about 20 hours, more preferably about 1 to about 10 hours, to obtain a single-phase product. This reheating step can be repeated until a single-phase product is obtained.

In one embodiment of the invention, the bismuth-vanadium-molybdenum-containing compositions made by the inventive process are represented by the formula $$Bi_a V_b Mo_c O_d \qquad (I)$$

wherein: a is a number that is preferably in the range of about 2 to about 11, more preferably about 4 to about 7; b is a number that is preferably in the range of about 0.7 to about 10, more preferably about 2 to about 6; c is a number that is preferably in the range of about 0.08 to about 4, more preferably about 0.5 to about 2; and d is the number of oxygens needed to fulfill the valence requirements of Bi, V and Mo.

In one embodiment of the invention, the ratios of bismuth to vanadium to molybdenum that are used in step (A) of the inventive process are selected to provide ratios of bismuth to vanadium to molybdenum in the final product corresponding to the ratios of bismuth to vanadium to molybdenum indicated in Formula (I).

In one embodiment of the invention, the bismuth-molybdenum-vanadium-containing compositions made by the inventive process have compositions within the quadrilateral defined by the points I, II, III and IV of FIG. 1. In FIG. 1, the designations Mo:2V, Mo:5V and Mo:11V refer to molar the ratio of V to Mo. These molar ratios are provided for at all points on the vertical lines marked by such designations in FIG. 1. The line designated Mo:2V passes through points II, VI, VII and III and thus at each of said points II, VI, VII and III the molar ratio of V to Mo is 2:1. Similarly, the line designated Mo:5V passes through points V and VIII and thus the molar ratio of V to Mo at such points is 5:1. The line designated Mo:11V passes through points I and IV and thus the molar ratio of V to Mo at such points is 11:1. The corners of the quadrilateral I-II-III-IV of FIG. 1 have the following compositions, in terms of molar percentage:

|     | $Bi_2O_3$ | $V_2O_5$ | $MoO_3$ |
| --- | --- | --- | --- |
| I   | 64.9 | 29.8 | 5.3 |
| II  | 60   | 20   | 20  |
| III | 45.5 | 27.3 | 27.2 |
| IV  | 50   | 42   | 8   |

In one embodiment of the invention, the ratios of bismuth to vanadium to molybdenum that are used in step (A) of the inventive process are selected to provide ratios of bismuth to vanadium to molybdenum in the final product corresponding to the ratios of bismuth to vanadium to molybdenum within the quadrilateral I-II-III-IV of FIG. 1.

In one embodiment of the invention, the bismuth-molybdenum-vanadium-containing compositions made by the inventive process have compositions within the quadrilateral defined by the points V, VI, VII and VIII of FIG. 1. The corners of the quadrilateral V-VI-VII-VIII have the following compositions, in terms of molar percentages:

|      | $Bi_2O_3$ | $V_2O_5$ | $MoO_3$ |
| ---  | --- | --- | --- |
| V    | 53.3 | 33.35 | 13.35 |
| VI   | 50   | 25   | 25  |
| VII  | 45.7 | 27.15 | 27.15 |
| VIII | 49   | 36.4 | 14.6 |

In one embodiment of the invention, the ratios of bismuth to vanadium to molybdenum that are used in step (A) of the inventive process are selected to provide ratios of bismuth to vanadium to molybdenum in the final product corresponding to the ratios of bismuth to vanadium to molybdenum within the quadrilateral V-VI-VII-VIII of FIG. 1.

To improve the properties (e.g., stability to heat, light and chemical attacks) of the bismuth-vanadium-molybdenum-containing compositions made by the inventive process, it is advantageous to coat such compositions during their preparation or in an after treatment in accordance with known processes with an inorganic protective coating. For this purpose, inorganic substances such as aluminum, titanium, antimony, cerium, zirconium, silicon compounds, zinc phosphate or mixtures thereof are applied as a coating to such compositions. This coating application can be carried out in one or more stages using known techniques. The amount of inorganic coating agent that is applied is preferably up to about 50% by weight, more preferably about 2% to about 50% by weight, more preferably about 5% to 50% by weight, based on the combined weight of the bismuth-vanadium-molybdenum-containing composition and coating agent.

To improve certain pigment properties, the bismuth-vanadium-molybdenum-containing compositions made by the inventive process can be treated with one or more texture-improving agents. These include, for example, long-chain aliphatic alcohols, esters, acids or salts thereof, amines, amides, waxes or resinous substances, such as abietic acid, hydrogenation products, esters or salts thereof. Also included are nonionic, anionic or cationic surface-active agents. These texture-improving agents are applied as a coating to the colorant using known techniques. The coating can be applied to the bismuth-vanadium-molybdenum-containing composition with or without first applying an inorganic coating of the type referred to above. If used in combination with such inorganic coating, the texture-improving agent is preferably applied as a second coat or overcoat overlying the inorganic protective coating. The amount of binding agent that is used is preferably up to about 70% by weight, more preferably about 10% to about 70% by weight, based on the total weight of the resulting product.

In one embodiment of the invention, the bismuth-vanadium-molybdenum-containing compositions are pigments that are initially coated with at least one coating of silica. Then at least one coating of at least one wax such as a polyolefin wax is applied over the silica coating to provide a pigment with enhanced abrasion resistance and color stability. The amount of silica that is applied is preferably up to about 50% by weight, more preferably 2% to about 50% by weight, more preferably about 5% to about 50% by weight, based on the combined weight of the pigment and the silica. The amount of wax that is applied is preferably up to about 70% by weight, more preferably about 10% to about 70% by weight, based on the total weight of the resulting product. The procedures and materials used for coating lead chromate pigments with silica and polyolefin wax disclosed in U.S. Pat. No. 3,773,535 at Col. 2, line 22 to Col. 7, line 68 are applicable to coating the pigments used herein; the foregoing section of U.S. Pat. No. 3,773,535 is incorporated herein by reference for its disclosure of such coating procedures and materials.

The bismuth-vanadium-molybdenum-containing compositions made by the inventive process have good pigment properties and are suitable for coloring organic compositions such as plastics, rubbers, and the like; inorganic compositions such as ceramics, porcelain enamels, and the like; and coating compositions such as paint, printing ink, and the like. The color exhibited by these compounds is dependent upon the particular ratio of components that are employed, but generally is yellow.

The plastic or rubber compositions and coating compositions that can be colored according to the invention are based on polymeric materials that can be of natural or synthetic origin. Examples include natural resins or drying oils, rubber or casein. Also included are modified natural substances, such as chlororubber, oil-modified alkyd resins, viscose, cellulose ethers or esters, such as cellulose acetate, cellulose propionate, cellulose acetobutyrate or nitrocellulose. Also included are wholly synthetic organic polymers (thermosets and thermoplastics) obtained by polymerization, polycondensation or polyaddition. Examples include polyolefins, such as polyethylene, polypropylene or polyisobutylene, substituted polyolefins, such as polymers of vinyl chloride, vinyl acetate, styrene, acrylonitrile, acrylic acid and/or methacrylic acid esters, butadiene, as well as copolymers of the monomers mentioned above, in particular ABS or EVA. Examples from the series of polyaddition and polycondensation resins are the condensation products of formaldehyde with phenols, phenolic resins, and the condensation products of formaldehyde with urea, thiourea and melamine, amino resins, polyesters, including not only saturated, for example alkyd resins, but also unsaturated, for example maleic resins, linear polyesters, polyamides and polycarbonates or silicones. These polymeric materials can be present individually or as mixtures, as plastic materials or melts which if desired can be spun into fibers. They can also be present in dissolved form as film formers or binders for lacquers, paints or printing inks, for example linseed oil varnish, nitrocellulose, alkyd resins, melamine resins and urea-formaldehyde resins or acrylic resins.

The coloring of plastic or rubber compositions with the bismuth-vanadium-molybdenum-containing compositions made by the inventive process is effected using known techniques, for example, by admixing a compound of this type, if desired in the form of a masterbatch, into the formulation using rolls or mixing or milling apparatus. The colored material is then brought into the desired final form by known processing techniques, such as calendaring, pressing, extruding, brushing, casting or injection molding. Frequently it is desirable, if non-rigid moldings are to be prepared or to reduce the brittleness thereof, to incorporate plasticizers into the formulation before molding. Suitable plasticizers are, for example, esters of phosphoric acid, phthalic acid or sebacic acid. The plasticizers can be incorporated into the formulation before or after the incorporation of the bismuth-vanadium-molybdenum-containing compositions made by the inventive process into such formulations. It is further possible, for the purpose of obtaining different colors, to add to the formulation, in addition to the bismuth-vanadium-molybdenum-containing compositions made by the inventive process, fillers or other coloring constituents such as white, color or black pigments, in any desired amounts.

To color coating compositions such as paints and printing inks, the polymeric materials mentioned above and the bismuth-vanadium-molybdenum-containing compositions made by the inventive process, if desired together with additives, such as fillers, other pigments, siccatives or plasticizers, are finely dispersed or dissolved in a common organic solvent or solvent mixture or water. This can be done by dispersing or dissolving the individual components separately or together in groups, and then combining all the components.

The ceramics that can be colored using the bismuth-vanadium-molybdenum-containing compositions made by the inventive process encompass a wide variety of engineering materials, other than metals and alloys, that are chemically inorganic and are rendered serviceable through high temperature processing. These ceramics are normally composed of both cationic and anionic species; their primary difference from other materials being in the nature of their chemical bonding. They are sometimes referred to as ionic solids, i.e., possessing ionic bonding. The ceramics that can be colored include, single crystals, polycrystalline materials, glass-bonded aggregates, insulating foams and wholly vitreous substances. These include glasses, glazes and porcelain or vitreous enamels.

The raw materials used in making these ceramics are primarily clay, including shale and mudstone, silica, and feldspar. Other raw materials include a wide variety of rocks, minerals and synthetic compounds used to manufacture diverse products.

The clays are of three principal families: kaolinite, $Al_4Si_4O_{10}(OH)_8$, montmorillonite, $X_yAl_2(Al_ySi_{4-y}O_{10})(OH)_2$ where X is usually Na, Mg, or Al, and illite, $K_y(AlFeMg_4Mg)(Al_ySi_{8-y})O_{20}(OH)_4$. Closely associated minerals are gibbsite, $Al(OH)_3$, diaspore, $HAlO_2$, and bauxite (of indefinite composition but usually given as $Al_2O_3.2H_2O$ which is an intermediate between the first two). All clays have as the major constituents one or more of these minerals. The kaolinite group includes kaolinite, halloysite, dickite, and nacrite. The montmorillonite group includes montmorillonite, nontronite, beidellite, hectorite, and saponite. The illite group, similar to muscovite but containing less potassium, more silica, and more combined water, includes the illites, the hydromicas, phengite, brammallite, glaucomite, and celadonite. There is a wide range of substitutions that occur in each family. In addition, most clays have one or more accessory minerals, e.g., quartz, muscovite, biotite, limonite, hydrous micas, feldspar, vermiculate, and/or carbonaceous matter.

The clays that can be used are sometimes referred to by names that reflect their use. For example: a pottery clay is used to make pottery; a sewer-pipe clay is used for sewer pipe; fire-clays (or refractory clay) are used to manufacture fireclay bricks, crucibles, refractory mortars, etc.; china clay is used to manufacture whitewares; slip clays are used for glazing stoneware and porcelain; and brick clays are used to manufacture common brick and face brick.

The silica can be in the form of quartz, tridymite, cristobalite, vitreous silica, cryptocrystalline forms, hydrated silica, and diatomite. Sources of silica that are useful include sandstones, quartzites, and sands.

Feldspars are used chiefly as fluxes and sources of $Al_2O_3$, $SiO_2$, alkalies ($K_2O$, $Na_2O$), and CaO. The plagioclase feldspars vary in composition from albite, $NaAlSi_3O_8$, to anorthite, $CaAl_2Si_2O_8$, in a continuous series of solid solutions. Orthoclase and microcline feldspar ($KAlSi_3O_8$) are referred to as potash feldspar. Anorthoclase, $(Na,K)AlSi_3O_8$, is a combination of albite and potash feldspar. High soda feldspars are used in glasses and glazes.

Other nonclay minerals include nepheline syenite, a rock that contains a large percentage of the mineral nephelite, $(Na,K)_2Al_2Si_2O_8$, along with some soda and potash feldspars; lime, derived by calcination of limestone chiefly calcium carbonate, $CaCO_3$, which is used in glazes, enamels, and glasses; magnesium silicates such as talc (used as a flux with clays), asbestos (used chiefly for insulating refractories), and olivine (used for refractory products; fluxing minerals which lower the vitrification temperature, the melting temperature or the reaction temperature, e.g., lithium minerals spodumene, $Li_2Al_2Si_4O_{12}$, lepidolite, $[K_2Li_3Al_3)-(Al_2Si_6O_{20}-(OH,F)_4]$, amblygonite, $Li_2F_2Al_2P_2O_8$, and petralite, $LiASi_4O_{10}$, as well as barium minerals such as barite, $BaSO_4$, and whiterite, $BaCO_3$; refractory minerals such as zirconium minerals, hydrated alumina minerals, titania, $TiO_2$, thoria, $ThO_2$, graphite, magnesite, dolomite, gypsum, chromite, the aluminum silicates, and pyrophyllite.

The forming methods used in the production of these ceramics include plastic deformation (e.g., extrusion, dry pressing and hot forming methods) and casting (e.g., slip and fusion casting). The bismuth-vanadium-molybdenum-containing compositions made by the inventive process are bended with the other constituents of the ceramic formulation using conventional colorant or pigment blending techniques. In preparing materials for forming, optimal particle size and size distribution may be obtained by crushing and grinding the various materials, separating the various size fractions by screening, and then blending the desired size fractions of each material. In cold forming, the ceramic ware is made oversize and shrinks during firing and drying. In hot forming (e.g., hot pressing, hot extrusion, hot rolling, forging and swaging, hot isostatic pressing, and chemical vapor deposition), the ceramic ware is made close to its final size.

Thermal treatment is an essential step in the manufacturing of these ceramics. Materials that are stable at room temperature have to be raised to relatively high temperatures (ranging from about 700° C. for enamels to about 1650° C. for alumina ceramics) for reactions to take place. Thermal treatment is a smoothly varying time-temperature profile, rather than a particular temperature held for some time period. To determine firing temperature and quality control, thermocouples, radiation pyrometers, and optical pyrometers are used. Expendable pyrometric cones can be used for structural clay products, porcelains and sanitary ware. Microstructures and properties of many specialty ceramics vary according to time-temperature profile and often require precise monitoring of thermal gradients and temperature.

Drying and binder removal generally occurs between about 0°–400° C. The ceramic loses physically held water and organic binders which are used in the forming operation. Firing occurs at higher temperatures, and involves these changes: dissociation, the loss of carbon dioxide by carbonate constituents of ceramic compositions; compound formation, the continued heating of clays which results in the formation of mullite, $3Al_2O_3.2SiO_2$; polymorphic transformation of materials capable of existing in more than one crystallographic arrangement, e.g., silica and zirconia; sintering, the fabrication of a product usually involving densification by pore removal through diffusional mechanisms; and vitrification.

The porcelain enameling process involves the re-fusing of powdered glass on a metal surface. The powdered glass is prepared by ball-milling the desired porcelain enamel glass. The bismuth-vanadium-molybdenum-containing compositions made by the inventive process are blended with the powdered glass using conventional blending techniques. The glass is smelted from raw batch materials. The smelter can be a box-shaped tank furnace. A continuous smelter, wherein the thoroughly mixed raw batch is fed in at one end and molten glass is flowing out at the other end, can be used.

Decomposttion, gas evolution, and solution occur during smelting. After the molten glass is smelted to a homogeneous liquid, it is poured in a thin stream of water or onto cooled metal rollers. This quenched glass, termed frit, is a friable material easily reduced to small particles by a ball-milling operation. Ball-milling the glass frit into small sized particles can be carried out whether the frit is wet or dry. Dry powders are used for dry-process cast-iron enameling and for electrostatic application on sheet steel. Dry powders are also prepared and marketed for the subsequent preparation of slurries and slips used in the wet-process application techniques.

The bismuth-vanadium-molybdenum-containing compositions made by the inventive process are present in the colored compositions of the invention at a suitable level to provide the desired degree of coloring. These bismuth-vanadium-molybdenum-containing compositions are typically employed concentration levels in the range of about 0.001% to about 40% by weight, more preferably about 0.01% to about 20% by weight based on the total weight of the colored compositions.

The bismuth-vanadtum-molybdenum-containing compositions made by the inventive process are characterized by good general pigment properties, such as good dispersibility, high tinctorial strength, purity, high hiding power, good overlacquering, migration, heat, light and weathering resistance, and good resistance to chemicals, such as acids, bases, organic solvents and industrial atmosphere. In addition they confer on the printing inks, paints and lacquers prepared therefrom good rheological behavior, and on the dried films a high gloss.

The following examples are provided for purposes of exemplifying the invention. Unless otherwise indicated, in the following examples as well as throughout the specification and claims, all parts and percentages are by weight, all temperatures are in degrees centigrade, and all pressures are atmospheric.

EXAMPLE 1

A first aqueous composition is prepared by adding 10 ml of 1:1 nitric acid to 460 ml of water. The temperature of the water is 40° C. The first aqueous composition has a pH of 1.0. The first aqueous composition is heated to 70° C. A second aqueous composition is prepared by adding 50 ml of concentrated nitric acid to 300 ml of water, then adding 97.5 gms of $Bi(NO_3)_3.5H_2O$ to the resulting solution. A third aqueous composition is prepared by adding 20 gms of NaOH, 11.7 gms of $NH_4VO_3$ and 12.1 gms of $Na_2MoO_4.2H_2O$ to 300 ml of water. Additional water is added to the third aqueous composition to provide said composition with a volume of 350 ml, The second aqueous composition and the third aqueous composition are simultaneously added to the first aqueous composition over a period of 40 minutes with the result being the formation of a fourth aqueous composition. The fourth aqueous composition comprises precipitated solids and has a pH of 0.8 and a temperature of 70° C. The pH of the fourth aqueous composition is increased to 1.0 by the addition of an NaOH solution (50 gms of NaOH dissolved in 100 ml of water) over a period of 35 minutes while maintaining the temperature of the fourth aqueous composition at 70° C. The fourth aqueous composition is maintained at 70° C. for two hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate-containtng composition.

EXAMPLE 2

A first aqueous composition is prepared by adding 20 ml of 1:1 nitric acid to 450 ml of water. The temperature of the water is 40° C. The first aqueous composition has a pH of 0.8. The first aqueous composition is heated to 70° C. A second aqueous composition is prepared by adding 46 ml of concentrated nitric acid to 300 ml of water, then adding 97.5 gms of $Bi(NO_3)_3.5H_2O$ to the resulting solution. A third aqueous composition is prepared by adding 20 gms of NaOH, 11.7 gms of $NH_4VO_3$ and 12.2 gms of $Na_2MoO_4.2H_2O$ to 350 ml of water. The second aqueous composition and the third aqueous composition are simultaneously added to the first aqueous composition over a period of 55 minutes with the result being the formation of a fourth aqueous composition. The fourth aqueous composition comprises precipitated solids and has a pH of 1.4 and a temperature of 70° C. The pH of the fourth aqueous composition is increased to 2.0 by the addition of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vana-dium-molybdate containing solids composition.

EXAMPLE 3

A first aqueous composition is prepared by adding 20 ml of 1:1 nitric acid to 450 ml of water. The first aqueous composition has a pH of 0.5. The first aqueous composition is heated to 70° C. A second aqueous composition is prepared by adding 46 ml of concentrated nitric acid to 400 ml of water, then adding 68.4 gms of $Bi(NO_3)_3.5H_2O$ to the resulting solution. Additional water is added to the second aqueous composition to provide a volume of 500 ml for said composition. A third aqueous composition is prepared by adding 20 gms of NaOH, 11.7 gms of $NH_4VO_3$ and 4.8 gms of $Na_2MoO_4.2H_2O$ to 300 ml of water. Additional water is added to the third aqueous composition to provide said composition with a volume of 350 ml. The first aqueous composition is stirred and the second aqueous composition and the third aqueous composition are simultaneously added to the first aqueous composition over a period of 55 minutes with the result being the formation of a fourth aqueous composition. The fourth aqueous composition comprises precipitated solids and has a pH of 0.6 and a temperature of 70° C. The pH of the fourth aqueous composition is increased to 2.0 by the addition of 70 ml of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

EXAMPLE 4

A first aqueous composition is prepared by adding 20 ml of 1:1 nitric acid to 450 ml of water. The first aqueous composition has a pH of 0.5. The first aqueous composition is heated to 70° C. A second aqueous composition is prepared by adding 46 ml of concentrated nitric acid to 300 ml of water, then adding 78.19 gms of $Bi(NO_3)_3 \cdot 5H_2O$ to the resulting solution. Additional water is added to the second aqueous composition to provide a volume of 500 ml for said composition. The second aqueous composition has a pH of 0.3. A third aqueous composition is prepared by adding 20 gms of NaOH, 11.7 gms of $NH_4VO_3$ and 7.26 gms of $Na_2MoO_4 \cdot 2H_2O$ to 300 ml of water. Additional water is added to the third aqueous composition to provide said composition with a volume of 350 ml. The third aqueous composition has a pH of 13. The first aqueous composition is stirred and the second aqueous composition and the third aqueous composition are simultaneously added to the first aqueous composition over a period of 55 minutes with the result being the formation of a fourth aqueous composition. The fourth aqueous composition comprises precipitated solids and has a pH of 0.6 and a temperature of 70° C. The pH of the fourth aqueous composition is increased to 2.0 by the addition of 73.3 ml of a NaOH solution (50 gms of NaOH dissolved in 100 ml of water) over a period of 35 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated to a temperature of 600° C. over a period of 1.5 hours, maintained at 600° C. for 2 hours, cooled to ambient temperature and ground to provide the desired bismuth-vanadtum-molybdate containing solids composition.

EXAMPLE 5

A first aqueous composition is prepared by adding 20 ml of 1:1 nitric acid to 450 ml of water. The first aqueous composition has a pH of 0.5. The first aqueous composition is heated to 70° C. A second aqueous composition is prepared by adding 46 ml of concentrated nitric acid to 400 ml of water, then adding 87.8 gms of $Bi(NO_3)_3 \cdot 5H_2O$ to the resulting solution. Additional water is added to the second aqueous composition to provide a volume of 500 ml for said composition. The pH of the second aqueous composition is 0.3. A third aqueous composition is prepared by adding 20 gms of NaOH, 11.7 gms of $NH_4VO_3$ and 9.68 gms of $Na_2MoO_4 \cdot 2H_2O$ to 300 ml of water. Additional water is added to the third aqueous composition to provide said composition with a volume of 350 ml. The pH of the third aqueous composition is 14. The first aqueous composition is stirred and the second aqueous composition and the third aqueous composition are simultaneously added to the first aqueous composition are simultaneously added to the first aqueous composition over a period of one hour with the result being the formation of a fourth aqueous composition. The fourth aqueous composition comprises precipitated solids and has a pH of 0.6 and a temperature of 70° C. The pH of the fourth aqueous composition is increased to 2.0 by the addition of 75 ml of a NaOH solution (50 gms of NaOH dissolved in 100 ml of water) over a period of one hour while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

EXAMPLE 6

A first aqueous composition is prepared by adding 20 ml of 1:1 nitric acid to 450 ml of water. The first aqueous composition has a pH of 0.5. The first aqueous composition is heated to 70° C. A second aqueous composition is prepared by adding 50 ml of concentrated nitric acid to 400 ml of water, then adding 97.5 gms of $Bi(NO_3)_3 \cdot 5H_2O$ to the resulting solution. Additional water is added to the second aqueous composition to provide a volume of 500 ml for said composition. A third aqueous composition is prepared by adding 20 gms of NaOH, 11.7 gms of $NH_4VO_3$ and 12.1 gms of $Na_2MoO_4 \cdot 2H_2O$ to 300 ml of water. Additional water is added to the third aqueous composition to provide said composition with a volume of 350 ml. The first aqueous composition is stirred and the second aqueous composition and the third aqueous composition are simultaneously added to the first aqueous composition over a period of one hour with the result being the formation of a fourth aqueous composition. The fourth aqueous composition comprises precipitated solids and has a pH of 1.4 and a temperature of 70° C. The pH of the fourth aqueous composition is increased to 2.0 by the addition of 70.5 ml of a NaOH solution (50 gms of NaOH dissolved in 100 ml of water) over a period of 45 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated to a temperature of 600° C. over a period of one hour, maintained at 600° C. for one hour, and cooled to ambient temperature and ground to provide the desired bismuth-vanadium-molybdate containing solids composition.

EXAMPLE 7

A first aqueous composition is prepared by adding 10 ml of 1:1 nitric acid to 460 ml of water. The first aqueous composition has a pH of 1.0. The first aqueous composition is heated to 70° C. A second aqueous composition is prepared by adding 50 ml of concentrated nitric acid to 280 ml of water, then adding 97.5 gms of $Bi(NO_3)_3 \cdot 5H_2O$ to the resulting solution. Additional water is added to the second aqueous composition to provide a volume of 350 ml for said composition. A third aqueous composition is prepared by adding 20 gms of NaOH, 11.7 gms of $NH_4VO_3$ and 12.1 gms of $Na_2MoO_4 \cdot 2H_2O$ to 300 ml of water. Additional water is added to the third aqueous composition to provide said composition with a volume of 350 ml. The first aqueous composition is stirred and the second aqueous composition and the third aqueous composition are simultaneously added to the first aqueous composition over a period of 40 minutes with the result being the formation of a fourth aqueous composition. The fourth aqueous composition comprises precipitated solids and has a pH of 0.8 and a temperature of 70° C. The pH of the fourth aqueous composition is increased to 1.0 by the addition of 45.5 ml of a NaOH solution (50 gms of NaOH dissolved in 100 ml of water) while maintaining the temperature of the fourth aqueous composition at 70° C. The fourth aqueous composition is maintained at 70° C. for two hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

EXAMPLE 8

A first aqueous composition is prepared by adding 20 ml of 1:1 nitric acid to 450 ml of water. The first aqueous composition has a pH of 0.5. The first aqueous composition is heated to 70° C. A second aqueous composition is prepared by adding 46 ml of concentrated nitric acid to 400 ml of water, then adding 107.2 gms of $Bi(NO_3)_3.5H_2O$ to the resulting solution. Additional water is added to the second aqueous composition to provide a volume of 500 ml for said composition. A third aqueous composition is prepared by adding 20 gms of NaOH, 11.7 gms of $NH_4VO_3$ and 14.52 gms of $Na_2MoO_4.2H_2O$ to 300 ml of water. Additional water is added to the third aqueous composition to provide said composition with a volume of 350 ml. The first aqueous composition is stirred and the second aqueous composition and the third aqueous composition are simultaneously added to the first aqueous composition over a period of one hour with the result being the formation of a fourth aqueous composition. The fourth aqueous composition comprises precipitated solids and has a pH of 0.5 and a temperature of 70° C. The pH of the fourth aqueous composition is increased to 2.2 by the addition of 89.8 ml of a NaOH solution (50 gms of NaOH dissolved in 100 ml of water) over a period of 50 minutes while maintaining the temperature of the fourth aqueous composition at 70° C. The fourth aqueous composition is maintained at 70° C. for two hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

EXAMPLE 9

A first aqueous composition is prepared by adding 20 ml of 1:1 nitric acid to 450 ml of water. The first aqueous composition has a pH of 0.5. The first aqueous composition is heated to 75° C. A second aqueous composition is prepared by adding 46 ml of concentrated nitric acid to 400 ml of water, then adding 121.8 gms of $Bi(NO_3)_3.5H_2O$ to the resulting solution. Additional water is added to the second aqueous composition to provide a volume of 500 ml for said composition. The second aqueous composition has a pH of 0.3. A third aqueous composition is prepared by adding 20 gms of NaOH, 11.7 gms of $NH_4VO_3$ and 18.5 gms of $Na_2MoO_4.2H_2O$ to 300 ml of water. Additional water is added to the third aqueous composition to provide said composition with a volume of 350 ml. The pH of the third aqueous composition is 13. The first aqueous composition is stirred and the second aqueous composition and the third aqueous composition are simultaneously added to the first aqueous composition over a period of 55 minutes with the result being the formation of a fourth aqueous composition. The fourth aqueous composition comprises precipitated solids and has a pH of 0.6 and a temperature of 75° C. The pH of the fourth aqueous composition is increased to 2.0 by the addition of 91 ml of a NaOH solution (50 gms of NaOH dissolved in 100 ml of water) over a period of 50 minutes while maintaining the temperature of the fourth aqueous composition at 75° C. The fourth aqueous composition is maintained at 75° C. for three hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

EXAMPLE 10

A first aqueous composition is prepared by adding 20 ml of 1:1 nitric acid to 450 ml of water. The first aqueous composition is heated to 72° C. A second aqueous composition is prepared by adding 46 ml of concentrated nitric acid to 400 ml of water, then adding 146 gms of $Bi(NO_3)_3.5H_2O$ to the resulting solution. Additional water is added to the second aqueous composition to provide a volume of 500 ml for said composition. A third aqueous composition is prepared by adding 20 gms of NaOH, 11.7 gms of $NH_4VO_3$ and 24.2 gms of $Na_2MoO_4.2H_2O$ to 300 ml of water. Additional water is added to the third aqueous composition to provide said composition with a volume of 350 ml. The first aqueous composition is stirred and the second aqueous composition and the third aqueous composition are simultaneously added to the first aqueous composition over a period of 55 minutes with the result being the formation of a fourth aqueous composition. The fourth aqueous composition comprises precipitated solids and has a pH of 0.4–0.6 and a temperature of 72° C. The pH of the fourth aqueous composition is increased to 2.0 by the addition of 96.4 ml of a NaOH solution (50 gms of NaOH dissolved in 100 ml of water) over a period of 40 minutes while maintaining the temperature of the fourth aqueous composition at 72° C. The fourth aqueous composition is maintained at 72° C. for three hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

EXAMPLE 11

A first aqueous composition is prepared by adding 20 ml of 1:1 nitric acid to 450 ml of water. The first aqueous composition has a pH of 0.5. The first aqueous composition is heated to 70° C. A second aqueous composition is prepared by adding 50 ml of concentrated nitric acid to 400 ml of water, then adding 267.3 gms of $Bi(NO_3)_3.5H_2O$ to the resulting solution. Additional water is added to the second aqueous composition to provide a volume of 500 ml for said composition. The second aqueous composition has a pH of 0.3. A third aqueous composition is prepared by adding 20 gms of NaOH, 11.7 gms of $NH_4VO_3$ and 54.4 gms of $Na_2MoO_4.2H_2O$ to 300 ml of water. Additional water is added to the third aqueous composition to provide said composition with a volume of 350 ml. The third aqueous composition has a pH of 13. The first aqueous composition is stirred and the second aqueous composition and the third aqueous composition are simultaneously added to the first aqueous composition over a period of one hour with the result being the formation of a fourth aqueous composition. The fourth aqueous composition comprises precipitated solids and has a pH of 0.6 and a temperature of 70° C. The pH of the fourth aqueous composition is increased to 2.0 by the addition of 155 ml of a NaOH solution (50 gms of NaOH dissolved in 100 ml of water) over a period of 70 minutes while maintaining the temperature of the fourth aqueous composition at 70° C. The fourth aqueous composition is maintained at 70° C. for three hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

EXAMPLE 12

A first aqueous composition is prepared by adding 10 ml of 1:1 nitric acid to 450 ml of water. The first aqueous composition has a pH of 1.0. The first aqueous composition is heated to 70° C. A second aqueous composition is prepared by adding 46 ml of concentrated nitric acid to 300 ml of water, then adding 98.5 gms of $Bi(NO_3)_3.5H_2O$ to the resulting solution. A third aqueous composition is prepared by adding 16 gms of NaOH (50% by weight aqueous solution), 18.4 gms of $Na_3VO_4$ and 12.1 gms of $Na_2MoO_4.2H_2O$ to 350 ml of water. The first aqueous composition is stirred and the second aqueous composition and the third aqueous composition are simultaneously added to the first aqueous composition over a period of one hour with the result being the formation of a fourth aqueous composition. The fourth aqueous composition comprises precipitated solids and has a pH of 0.6 and a temperature of 70° C. The pH of the fourth aqueous composition is increased to 1.0 by the addition of 46 ml of a NaOH solution (50 gms of NaOH dissolved in 100 ml of water) over a period of 13 minutes while maintaining the temperature of the fourth aqueous composition at 70°-72° C. The fourth aqueous composition is maintained at 55°-70° C. for two hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

EXAMPLE 13

A first aqueous composition is prepared by adding 10 ml of 1:1 nitric acid to 450 ml of water. The first aqueous composition has a pH of 1.0. The first aqueous composition is heated to 70° C. A second aqueous composition is prepared by adding 46 ml of concentrated nitric acid to 300 ml of water, then adding 96.0 gms of $Bi(NO_3)_3.5H_2O$ to the resulting solution. A third aqueous composition is prepared by adding 16 gms of NaOH, 12.2 gms of $NaVO_3$ and 12.1 gms of $Na_2MoO_4.2H_2O$ to 350 ml of water. The first aqueous composition is stirred and the second aqueous composition and the third aqueous composition are simultaneously added to the first aqueous composition over a period of 65 minutes with the result being the formation of a fourth aqueous composition. The fourth aqueous composition comprises precipitated solids and has a pH of 0.5 and a temperature of 70° C. The pH of the fourth aqueous composition is increased to 4.0 by the addition of 74 ml of a NaOH solution (50 gms of NaOH dissolved in 100 ml of water) over a period of 20 minutes while maintaining the temperature of the fourth aqueous composition at 70°-72° C. The fourth aqueous composition is maintained at 70° C. for two hours with stirring. The precipitated solids in the fourth aqueous composition are separated out using filtration, washed and then dried. The dried solids are heated at a temperature of 600° C. for one hour, cooled to ambient temperature and ground to provide the desired bismuth-vanadium-molybdate containing solids composition.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A process for making a bismuth-vanadium-molybdenum-containing composition comprising:
   (A) preparing three separate aqueous compositions comprising: a first aqueous composition having a pH in the range of about 0.5 to about 4; a second aqueous composition comprising bismuth and having a pH in the range of about 0.2 to about 3; and a third aqueous composition comprising at least one salt of vanadium and at least one salt of molybdenum and having a pH in the range of about 9 to about 14;
   (B) adding said second aqueous composition and said third aqueous composition simultaneously to said first aqueous composition to form a fourth aqueous composition, and maintaining said fourth aqueous composition at a temperature in the range of about 30° C. to about 90° C. for up to about 4 hours, said fourth aqueous composition comprising precipitated solids;
   (C) separating said solids from said fourth aqueous composition; and
   (D) heating said solids at a temperature in the range of about 250° C. to about 675° C. for about 0.5 to about 30 hours to provide said bismuth-vanadium-molybdenum-containing composition.

2. The process of claim 1 wherein during step (B) an effective amount of at least one base is added to said fourth aqueous composition to increase the yield of bismuth in said precipitated solids.

3. The process of claim 1 with the step of washing and drying said solids from step (C).

4. The process of claim 1 wherein said first aqueous composition has a pH in the range of about 0.5 to about 1.5.

5. The process of claim 1 wherein said second aqueous composition has a pH in the range of about 0.2 to about 2.

6. The process of claim 1 wherein said third aqueous composition has a pH in the range of about 10 to about 14.

7. The process of claim 1 wherein said fourth aqueous composition has a pH in the range of about 0.5 to about 6.

8. The process of claim 1 wherein said first aqueous composition has a temperature in the range of about 30° C. to about 90° C.

9. The process of claim 1 wherein said second aqueous composition has a temperature in the range of about 30° C. to about 50° C.

10. The process of claim 1 wherein said third aqueous composition has a temperature in the range of about 30° C. to about 70° C.

11. The process of claim 1 wherein said fourth aqueous composition has a temperature in the range of about 50° C. to about 80° C. during step (B).

12. The process of claim 1 wherein the concentration of the bismuth in said second aqueous composition is in the range of about 50 to about 800 gms/liter.

13. The process of claim 1 wherein the concentration of the vanadium in said third aqueous composition is in the range of about 5 to about 200 gms/liter.

14. The process of claim 1 wherein the concentration of the molybdenum in said third aqueous composition is in the range of about 1 to about 100 gms/liter.

15. The process of claim 1 wherein the mole ratio of vanadium to molybdenum in said third aqueous composition is in the range of about 11:1 to about 2:1.

16. The process of claim 1 wherein the mole ratio of vanadium to molybdenum in said third aqueous composition is about 5:1.

17. The process of claim 1 wherein during step (D) the temperature of said solids is increased to a peak temperature in the range of about 525° C. to about 675° C. over a period of about 1 minute to about 4 hours, maintained at said peak temperature for about 1 to about 10 hours, and cooled to ambient temperature.

18. The process of claim 1 wherein during step (D) the temperature of said solids is increased to a peak temperature in the range of about 575° C. to about 625° C. over a period of about 1 minute to about 4 hours, maintained at said peak temperature for about 2 to about 6 hours, and cooled to ambient temperature.

19. The process of claim 1 wherein during step (D) the temperature of said solids is increased to an intermediate temperature in the range of about 250° C. to about 450° C. over a period of about 1 minute to about 4 hours, maintained at said intermediate temperature for about 1 to about 10 hours, increased to a peak temperature in the range of about 525° C. to about 675° C. over a period of about 1 minute to about 4 hours, maintained at said peak temperature for about 1 to about 10 hours, and cooled to ambient temperature.

20. The process of claim 1 wherein during step (D) the temperature of said solids is increased to an intermediate temperature in the range of about 250° C. to about 450° C. over a period of about 1 minute to about 2 hours, maintained at said intermediate temperature for about 1 to about 4 hours, increased to a peak temperature in the range of about 575° C. to about 625° C. over a period of about 30 minutes to about 3 hours, maintained at said peak temperature for about 1 to about 4 hours, and cooled to ambient temperature.

21. The process of claim 1 with the additional step of heating said bismuth-vanadium-molybdenum-containing composition from (D) at a temperature in the range of about 525° C. to about 675° C. for about 1 to about 10 hours.

22. The process of claim 1 with the additional step of heating said bismuth-vanadium-molybdenum-containing composition from (D) at a temperature in the range of about 525° C. to about 675° C. for about 1 to about 4 hours.

23. The process of claim 1 with the step of applying an inorganic protective coating to said bismuth-vanadium-molybdenum-containing composition from step (D).

24. The process of claim 1 with the steps of applying an inorganic protective coating to said bismuth-vanadium-molybdenum-containing composition from step (D) to form a coated composition, and applying at least one coating of at least one texture-improving agent to said coated composition.

25. The process of claim 1 with the step of applying a coating of silica to said bismuth-vanadium-molybdenum-containing composition from step (D).

26. The process of claim 1 with the steps of applying a coating of silica to said bismuth-vanadium-molybdenum-containing composition from step (D) to form a coated composition, and applying at least one coating of at least one wax to said coated composition.

27. The process of claim 1 wherein a bismuth salt is used, said salt of bismuth comprises $Bi(NO_3)_3 \cdot 5H_2O$.

28. The process of claim 1 wherein said salt of vanadium comprises $NH_4VO_3$, $Na_3VO_4$, $NaVO_3$ or a mixture of two or more thereof.

29. The process of claim 1 wherein said salt of molybdenum comprises an alkali metal molybdate.

30. The process of claim 1 wherein said salt of molybdenum comprises $Na_2MoO_4 \cdot 2H_2O$.

31. The process of claim 1 wherein said bismuth-vanadium-molybdenum-containing composition is represented by the formula $$Bi_aV_bMo_cO_d$$

wherein: a is a number in the range of about 2 to about 11; b is a number in the range of about 0.7 to about 10; c is a number in the range of about 0.08 to about 4; and d is the number of oxygens needed to fulfill the valence requirements of Bi, V and Mo.

32. The process of claim 1 wherein said bismuth-vanadium-molybdenum-containing composition has a molar percentage composition within the quadrilateral I-II-III-IV of FIG. 1.

33. The process of claim 1 wherein said bismuth-vanadium-molybdenum-containing composition has a molar percentage composition within the quadrilateral V-VI-VII-VIII of FIG. 1.

34. A process for making a bismuth-vanadium-molybdenum-containing composition comprising:
(A) preparing three separate aqueous compositions comprising: a first aqueous composition comprising nitric acid and having a pH in the range of about 0.5 to about 4; a second aqueous composition comprising bismuth nitrate and nitric acid, said second aqueous composition having a pH in the range of about 0.2 to about 3; and a third aqueous composition comprising ammonium metavandate, at least one alkali metal salt of molybdenum and at least one alkali metal hydroxide, said third aqueous composition having a pH in the range of about 9 to about 14;
(B) adding said second aqueous composition and said third aqueous composition simultaneously to said first aqueous composition to form a fourth aqueous composition, and maintaining said fourth aqueous composition at a temperature in the range of about 30° C. to about 90° C. for up to about 4 hours, said fourth aqueous compositions comprising precipitated solids;

(C) separating said solids from said fourth aqueous composition; and (D) heating said solids to a peak temperature in the range of about 525° C. to about 675° C. over a period of about 1 minute to about 4 hours, maintaining said solids at said peak temperature for about 1 to about 10 hours, and cooling said solids to ambient temperature to provide said bismuth-vanadium-molybdenum-containing composition.

35. A process for making a bismuth-vanadium-molybdenum-containing composition comprising:

(A) preparing three separate aqueous compositions comprising: a first aqueous composition comprising nitric acid and having a pH in the range of about 0.5 to about 4; a second aqueous composition comprising bismuth nitrate and nitric acid, said second aqueous composition having a pH in the range of about 0.2 to about 3; and a third aqueous composition comprising ammonium metavanadate, at least one alkali metal salt of molybdenum and at least one alkali metal hydroxide, said third aqueous composition having a pH in the range of about 9 to about 14;

(B) adding said second aqueous composition and said third aqueous composition simultaneously to said first aqueous composition to form a fourth aqueous composition, and maintaining said fourth aqueous composition at a temperature in the range of about 30° C. to about 90° C. for up to about 4 hours, said fourth aqueous composition precipitated solids;

(C) separating said solids from said fourth aqueous composition; and (D) heating said solids to an intermediate temperature in the range of about 250° C. to about 450° C. over a period of about 1 minute to about 4 hours, maintaining said solids at said intermediate temperature for about 1 to about 10 hours, heating said solids to a peak temperature in the range of about 525° C. to about 675° C. over a period of about 1 minute to about 4 hours, maintaining said solids at said peak temperature for about 1 to about 10 hours, and cooling said solids to ambient temperature to provide said bismuth-vanadium-molybdenum-containing composition.

* * * * *